United States Patent
Shen

(10) Patent No.: US 12,392,678 B2
(45) Date of Patent: Aug. 19, 2025

(54) METHODS, APPARATUSES, AND COMPUTER PROGRAM PRODUCTS FOR FUGITIVE GAS QUANTIFICATION

(71) Applicant: Rebellion Photonics, Inc., Houston, TX (US)

(72) Inventor: Quan Shen, Houston, TX (US)

(73) Assignee: Rebellion Photonics, Inc., Houston, TX (US)

( * ) Notice: Subject to any disclaimer, the term of this patent is extended or adjusted under 35 U.S.C. 154(b) by 490 days.

(21) Appl. No.: 17/971,189

(22) Filed: Oct. 21, 2022

(65) Prior Publication Data

US 2024/0133763 A1 Apr. 25, 2024
US 2024/0230450 A9 Jul. 11, 2024

(51) Int. Cl.
*G01M 3/04* (2006.01)
*G06N 5/022* (2023.01)

(52) U.S. Cl.
CPC .............. *G01M 3/04* (2013.01); *G06N 5/022* (2013.01)

(58) Field of Classification Search
CPC ................................ G01M 3/04; G06N 5/022
USPC .............................................................. 73/40
See application file for complete search history.

(56) References Cited

U.S. PATENT DOCUMENTS

| | | | |
|---|---|---|---|
| 10,197,470 B2 | 2/2019 | Waxman et al. | |
| 10,458,905 B2 | 10/2019 | Kester et al. | |
| 11,143,572 B2 | 10/2021 | Waxman et al. | |
| 2016/0097713 A1* | 4/2016 | Kester | G01J 3/2823 356/51 |
| 2017/0336281 A1* | 11/2017 | Waxman | G01N 21/359 |
| 2018/0266944 A1* | 9/2018 | Waxman | G01F 1/76 |
| 2019/0145891 A1* | 5/2019 | Waxman | G01N 21/3504 356/409 |

FOREIGN PATENT DOCUMENTS

WO 2021/246130 A1 12/2021

OTHER PUBLICATIONS

Communication about intention to grant a European patent Mailed on Jun. 19, 2024 for EP Application No. 23204770, 6 page(s).
Decision to grant a European patent Mailed on Oct. 4, 2024 for EP Application No. 23204770, 2 page(s).

* cited by examiner

*Primary Examiner* — Nathaniel T Woodward
(74) *Attorney, Agent, or Firm* — Alston & Bird LLP

(57) ABSTRACT

Methods, apparatuses, and computer program products for fugitive gas quantification are provided. For example, a computer-implemented method may include obtaining gas column density maps associated with one or more gas leak tests, each with an associated distance and leak rate; if the density maps do not meet a predefined quality threshold, filtering the density maps to remove any that do not meet predefined quality metrics and generating a leak rate predictive model based on providing some or all of any remaining density maps that meet the predefined quality metrics, associated distances from the gas leak imaging device to the gas leak tests, and associated leak rates to an artificial intelligence algorithm; and if the density maps meet the predefined quality threshold, generating a leak rate predictive model based on providing some or all of the density maps, associated distances, and associated leak rates to the artificial intelligence algorithm.

15 Claims, 8 Drawing Sheets

METHODS, APPARATUSES, AND COMPUTER PROGRAM PRODUCTS FOR FUGITIVE GAS QUANTIFICATION

FIELD OF THE INVENTION

Example embodiments of the present disclosure relate generally to detecting and quantifying fugitive gas and, more particularly, to methods, apparatuses, and computer program products for providing artificial-intelligence-based quantification of fugitive gas.

BACKGROUND

Hydrocarbon gas leaks are becoming more common, especially with the increased use of liquid natural gas (LNG) in industry. Such leaks, often termed fugitive emissions, can happen during storage, delivery, processing, and consumption. Gas leaks bring a risk to health and safety as well as negative impact on the environment. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and computer program products for fugitive gas quantification.

In accordance with various embodiments of the present disclosure, an apparatus is provided. In some embodiments, the apparatus comprises at least one processor and at least one non-transitory memory comprising program code. In some embodiments, the at least one non-transitory memory and the program code are configured to, with the at least one processor, cause the apparatus to at least: obtain a plurality of gas column density maps associated with one or more gas leak tests, each gas column density map having an associated distance from a gas leak imaging device to a corresponding one of the one or more gas leak tests and an associated leak rate of a corresponding one of the one or more gas leak tests; determine if the plurality of gas column density maps meet a predefined quality threshold; if the plurality of gas column density maps does not meet the predefined quality threshold, filter the plurality of gas column density maps to remove any gas column density maps that do not meet one or more predefined quality metrics and generate a leak rate predictive model based at least in part on providing some or all of any remaining gas column density maps that do meet the one or more predefined quality metrics, associated distances from the gas leak imaging device to the corresponding one of the one or more gas leak tests, and associated leak rates of the corresponding one of the one or more gas leak tests to an artificial intelligence algorithm; and if the plurality of gas column density maps does meet the predefined quality threshold, generate a leak rate predictive model based at least in part on providing some or all of the gas column density maps, associated distances from the gas leak imaging device to the corresponding one of the one or more gas leak tests, and associated leak rates of the corresponding one of the one or more gas leak tests to the artificial intelligence algorithm.

In some embodiments, each gas column density map comprises one or more discrete plumes; at least one of the predefined quality metrics comprises a number of discrete plumes in a gas column density map being less than a predefined plume threshold; and the at least one non-transitory memory and the program code are configured to, with the at least one processor, cause the apparatus to determine a number of discrete plumes for each gas column density map; and remove each gas column density map in which the number of discrete plumes is greater than the predefined plume threshold.

In some embodiments, if the plurality of gas column density maps meets the predefined quality threshold, the at least one non-transitory memory and the program code are configured to, with the at least one processor, cause the apparatus to obtain a plurality of gas column density maps from a non-test gas leak, each gas column density map having an associated distance from a gas leak imaging device to the non-test gas leak; and provide the plurality of gas column density maps from the non-test gas leak and the corresponding distances from the gas leak imaging device to the non-test gas leak to the leak rate predictive model to generate a predicted leak rate for each of the plurality of gas column density maps from the non-test gas leak.

In some embodiments, the at least one non-transitory memory and the program code are configured to, with the at least one processor, cause the apparatus to apply a smoothing algorithm to some or all of the generated predicted leak rates for the plurality of gas column density maps from the non-test gas leak.

In some embodiments, the plurality of gas column density maps from one or more gas leak tests each have an associated leak location expressed as one or more pixels of the corresponding gas column density map; and the at least one non-transitory memory and the program code are configured to, with the at least one processor, cause the apparatus to generate a leak location predictive model based at least in part on providing any remaining gas column density maps and associated leak locations to an artificial intelligence algorithm.

In accordance with various embodiments of the present disclosure, a computer-implemented method is provided. In some embodiments, the computer-implemented method comprises obtaining a plurality of gas column density maps associated with one or more gas leak tests, each gas column density map having an associated distance from a gas leak imaging device to a corresponding one of the one or more gas leak tests and an associated leak rate of a corresponding one of the one or more gas leak tests; determining if the plurality of gas column density maps meet a predefined quality threshold; if the plurality of gas column density maps does not meet the predefined quality threshold, filtering the plurality of gas column density maps to remove any gas column density maps that do not meet one or more predefined quality metrics and generating a leak rate predictive model based at least in part on providing some or all of any remaining gas column density maps that do meet the one or more predefined quality metrics, associated distances from the gas leak imaging device to the corresponding one of the one or more gas leak tests, and associated leak rates of the corresponding one of the one or more gas leak tests to an artificial intelligence algorithm; and if the plurality of gas column density maps does meet the predefined quality threshold, generating a leak rate predictive model based at least in part on providing some or all of the gas column density maps, associated distances from the gas leak imaging device to the corresponding one of the one or more gas leak tests, and associated leak rates of the corresponding one of the one or more gas leak tests to the artificial intelligence algorithm.

In accordance with various embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to obtain a plurality of gas column density maps associated with one or more gas leak tests, each gas column density map having an associated distance from a gas leak imaging device to a corresponding one of the one or more gas leak tests and an associated leak rate of a corresponding one of the one or more gas leak tests; determine if the plurality of gas column density maps meet a predefined quality threshold; if the plurality of gas column density maps does not meet the predefined quality threshold, filter the plurality of gas column density maps to remove any gas column density maps that do not meet one or more predefined quality metrics and generate a leak rate predictive model based at least in part on providing some or all of any remaining gas column density maps that do meet the one or more predefined quality metrics, associated distances from the gas leak imaging device to the corresponding one of the one or more gas leak tests, and associated leak rates of the corresponding one of the one or more gas leak tests to an artificial intelligence algorithm; and if the plurality of gas column density maps does meet the predefined quality threshold, generate a leak rate predictive model based at least in part on providing some or all of the gas column density maps, associated distances from the gas leak imaging device to the corresponding one of the one or more gas leak tests, and associated leak rates of the corresponding one of the one or more gas leak tests to the artificial intelligence algorithm.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying FIGURES. It will be appreciated that, for simplicity and clarity of illustration, elements illustrated in the FIGURES have not necessarily been drawn to scale, unless described otherwise. For example, the dimensions of some of the elements may be exaggerated relative to other elements, unless described otherwise. Embodiments incorporating teachings of the present disclosure are shown and described with respect to the FIGURES presented herein, in which.

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

Figure 3:
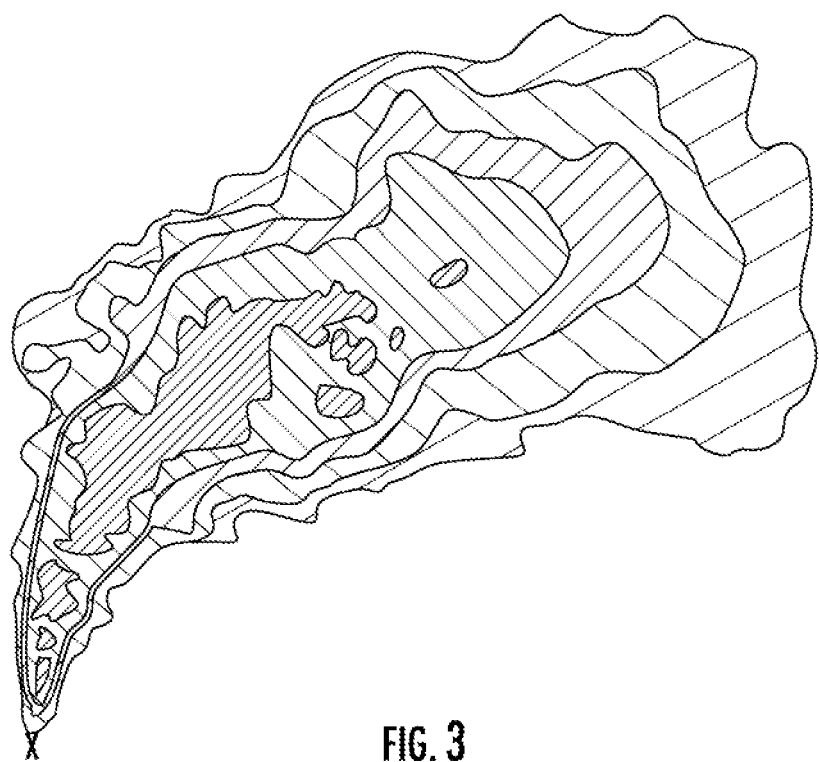
FIG. 3 illustrates an example gas column density map, such as may be produced by an example gas leak detection system in accordance with example embodiments of the present disclosure.
Figure 4:
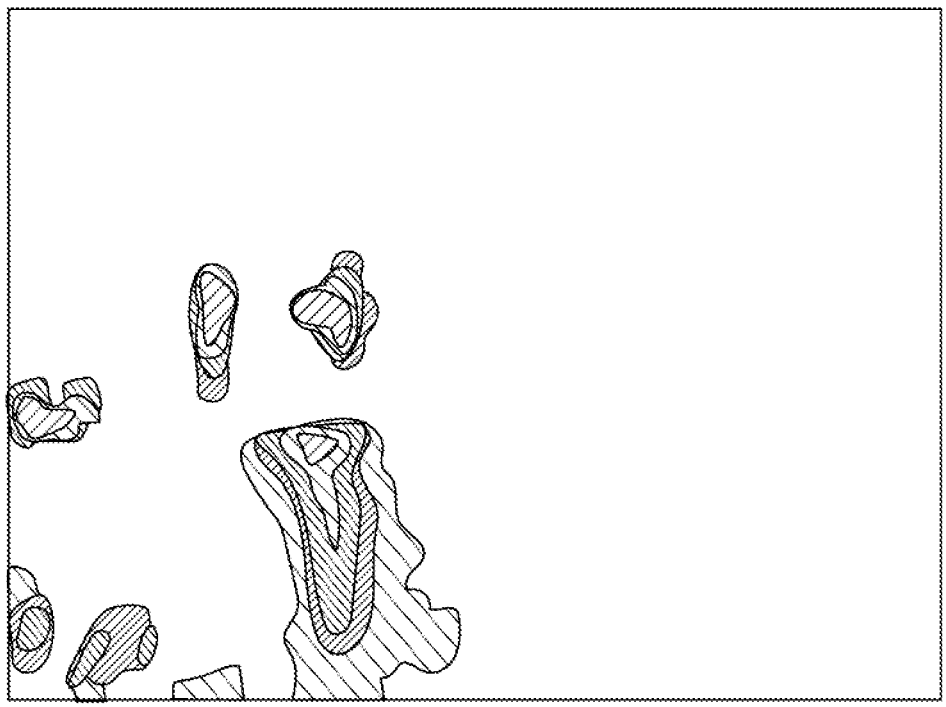
FIG. 4 illustrates an example gas column density map, such as may be produced by an example gas leak detection system in accordance with example embodiments of the present disclosure.

In the present disclosure, the term "fugitive gas" refers to a gas that has leaked or otherwise been unintentionally released from a pressurized containment—such as appliances, storage tanks, pipelines, wells, or other pieces of equipment. Such a gas might include natural gas (methane) or any type of gas for which, if leaking, it would be desirable to locate and quantify the leak. Co-owned U.S. Pat. No. 10,458,905 to Kester et al. (the contents of which are incorporated herein in its entirety) describes a system that uses hyperspectral imaging to detect a gas leak, enable a user to visualize the leaking gas plume (which may not be visible to the human eye), and quantify the amount of gas that has leaked. Such a hyperspectral imaging system determines how much gas is present along each of many different columns in the gas cloud. This measurement along each column is often termed the "path-integrated gas concentration" and is typically measured in parts-per-million-meter ("ppm-m"). Such a hyperspectral imaging system may use the path-integrated gas concentration data to create gas concentration maps (also termed gas column density maps). A gas column density map provides a two-dimensional visual representation of the path-integrated gas concentration data. FIGS. 3 and 4 each illustrate a different example gas column density map. Typically, a gas column density map uses different colors to indicate different concentrations (or ranges of concentrations) of gas along the columns of gas. While various color schemes may be used, in some embodiments red may indicate the highest concentrations, followed by orange, yellow, green, and blue. FIGS. 3 and 4 use different hatching patterns, rather than different colors, to indicate the different concentrations (or ranges of concentrations) of gas.

Such a hyperspectral imaging system may display the gas column density map(s) to a user (or users). Such a hyperspectral imaging system may perform further analysis of the path-integrated gas concentration data, such as determining an amount of gas that has leaked. Many factors, such as the structure/architecture near the leak, wind, humidity, etc., lead, in some examples, to difficulty of determining an amount of gas leaked. Much development activity related to such hyperspectral imaging systems is on-going and continues to improve the capability of such hyperspectral imaging system to accurately translate the path-integrated gas concentration data into gas leak rate data.

Various embodiments of the present disclosure provide an artificial intelligence (AI) based gas leak rate predictive engine. Even as development work continues to improve the translation of path-integrated gas concentration data into gas leak rate data within a hyperspectral imaging system, path-integrated gas concentration data (typically in the form of gas column density maps) can be used to train such an AI based gas leak rate predictive engine.

In some embodiments, gas column density maps, typically from one or more test leaks, will be input into an AI system, such as a neural network. Additionally, for each gas column density map, an associated distance from the gas leak imaging device to the corresponding gas leak test and an associated leak rate of the corresponding gas leak test will be input into to a training model of the AI system, as described further below.

In order to accurately train an AI system to predict a gas leak rate based on gas column density maps, it is desirable to have good quality gas column density maps. However, due to inherent challenges in imaging and analyzing gas leaks with a hyperspectral imaging system, it is possible that an undesirably high percentage of gas column density maps produced by a hyperspectral imaging system may not be of sufficient quality to use to train an AI system. As such, it may be desirable to filter out some or all of the low quality gas column density maps before inputting the gas column density maps into the learning portion of the AI system.

Figure 1:
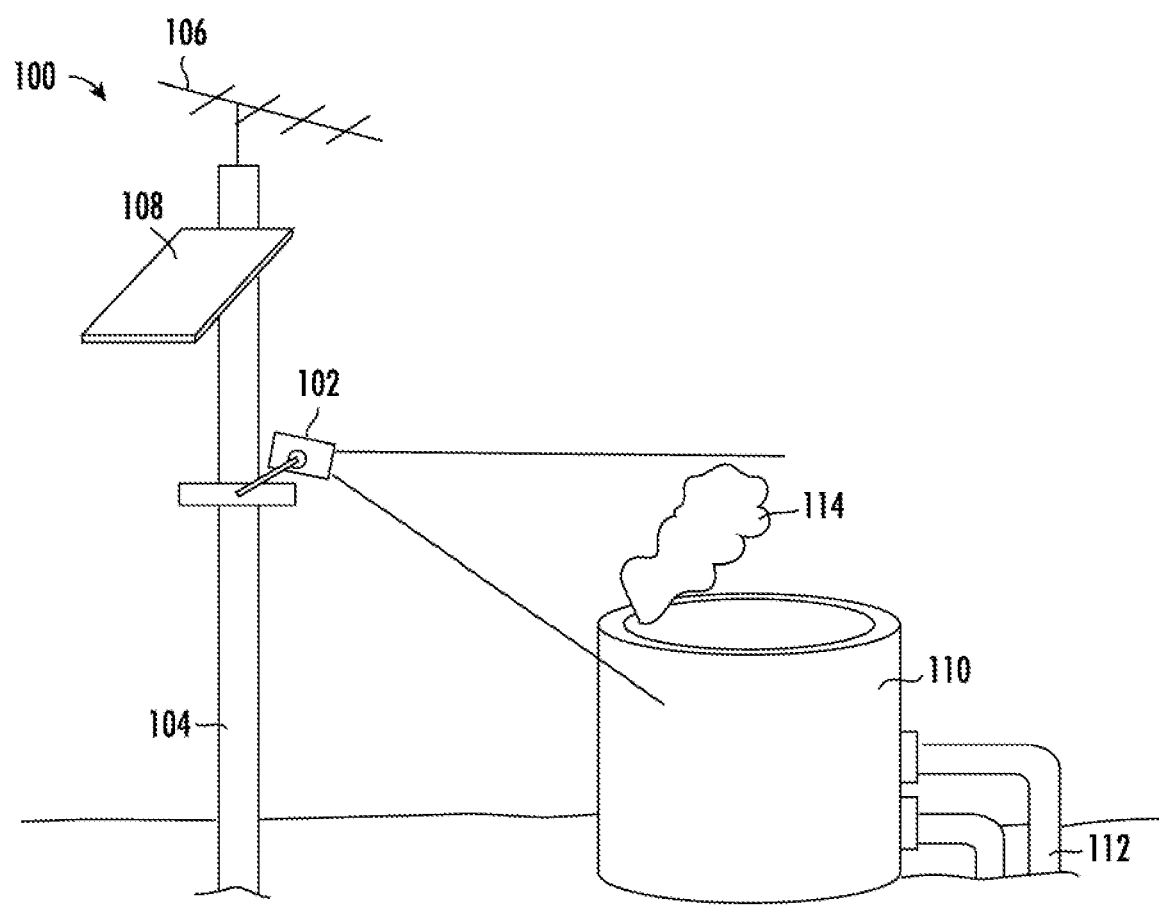
FIG. 1 is an example schematic diagram illustrating an example gas storage site with a gas leak detection system that may be used with some embodiments of the present disclosure.

Referring now to the FIGURES, FIG. 1 is an example schematic diagram illustrating an example gas storage site 100 with a gas leak detection system that may be used with some embodiments of the present disclosure. The simplified gas storage site 100 of FIG. 1 comprises a gas storage tank 110 connected to one or more pipes 112 that may feed gas into or remove gas from the storage tank 110. A gas cloud or plume 114 is shown escaping from the storage tank 110. A hyperspectral imaging device 102, such as is described in U.S. Pat. No. 10,458,905 to Kester et al., may be installed and positioned such that one or more areas in which a potential gas leak might occur are in the field of view of the hyperspectral imaging device 102. While only one hyperspectral imaging component is illustrated in FIG. 1, such a gas storage site would likely have many such hyperspectral imaging components installed in many different areas of the gas storage site. The hyperspectral imaging device 102 may be mounted high on a pole 104, as shown, to improve its field of view. A solar panel 108 (or any other suitable power source) can be provided at or near the hyperspectral imaging device 102 to help provide power to the hyperspectral imaging device 102. An antenna 106 can electrically couple to the hyperspectral imaging device 102 and can provide wireless communication between the hyperspectral imaging device 102 and any other external entity, such as a central processing apparatus, for storing and/or processing the data captured by the hyperspectral imaging device 102. Alternatively, a hard-wired communication link may be provided between the hyperspectral imaging device 102 and any other external entity.

The hyperspectral imaging device 102 can be programmed to monitor the site continuously or periodically. If a gas cloud 104 escapes from the storage tank 110, such as by leaking from a broken valve, then the hyperspectral imaging device 102 can capture a multispectral snapshot image or series of images (e.g., a video stream) of the gas cloud 104. The hyperspectral imaging device 102 can include imaging, processing, and communications components on board the hyperspectral imaging device 102 to identify and characterize the types of gases in the cloud 114 and to transmit the processed data to a central processing apparatus, e.g., by way of the antenna 106. Alternatively, the hyperspectral imaging device 102 may simply capture and transmit the images, with further processing being performed, e.g., at a central processing apparatus.

Figure 2:
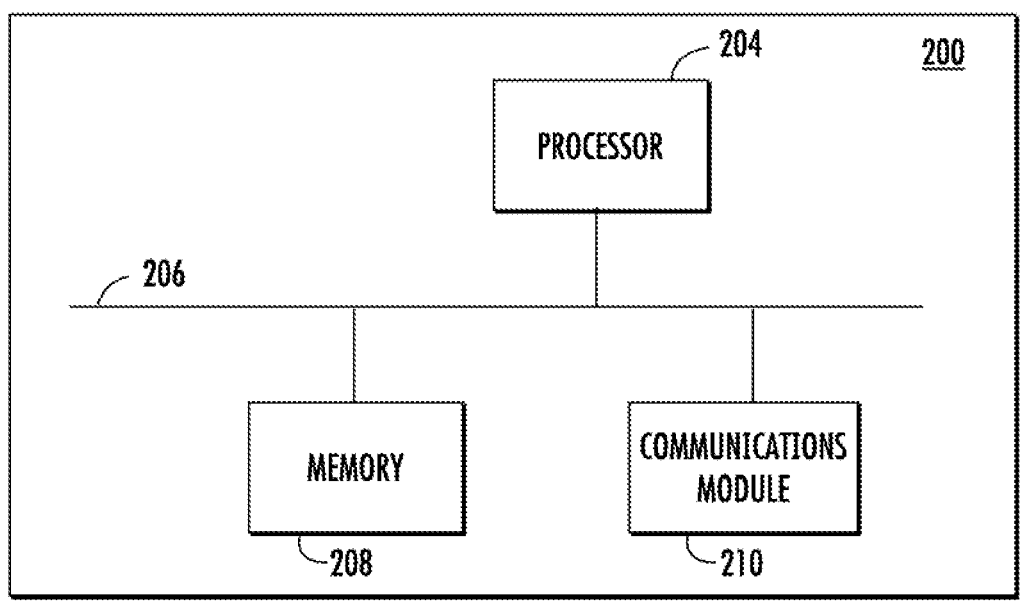
FIG. 2 illustrates an example block diagram of an example central processing apparatus of an example gas leak detection system in accordance with example embodiments of the present disclosure.

FIG. 2 illustrates an example block diagram of an example central processing apparatus of an example gas leak detection system in accordance with example embodiments of the present disclosure. Such a central processing apparatus 200 may receive and process hyperspectral images from one or more hyperspectral imaging devices 102 described above. The central processing apparatus 200 may include a processor 204, a memory 208, and communications circuitry 210 that are in electronic communication with one another via a system bus 206. In some embodiments, the system bus 206 refers to a computer bus that connects these components so as to enable data transfer and communications between these components.

In some embodiments, the processor 204 processes path-integrated gas concentration data received from one or more hyperspectral imaging devices 102 to generate a plurality of gas column density maps, such as is shown in FIGS. 3 and 4. In some embodiments, the processing of path-integrated gas concentration data may occur entirely in one or more hyperspectral imaging devices such as hyperspectral imaging device 102, entirely within a central processing apparatus such as central processing apparatus 200, or partly within one or more hyperspectral imaging devices and partly within a central processing apparatus.

The processor 204 may be embodied in a number of different ways and may, for example, include one or more processing devices configured to perform independently. Additionally, or alternatively, the processor 204 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

For example, the processor 204 may be embodied as one or more complex programmable logic devices (CPLDs), microprocessors, multi-core processors, co-processing entities, application-specific instruction-set processors (ASIPs), and/or controllers. Further, the processor 204 may be embodied as one or more other processing devices or circuitry. The term circuitry may refer to an entirely hardware embodiment or a combination of hardware and computer program products. Thus, the processor 204 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 204 may be configured for a particular use or configured to execute instructions stored in volatile or non-volatile media or otherwise accessible to the processor 204. As such, whether configured by hardware or computer program products, or by a combination thereof, the processor 204 may be capable of performing steps or operations according to embodiments of the present disclosure when configured accordingly.

In an example embodiment, the processor 204 may be configured to execute instructions stored in the memory 208 or otherwise accessible to the processor. Alternatively, or additionally, the processor 204 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 204 is embodied as an executor of software instructions, the instructions may specifically configure the processor to perform the algorithms and/or operations described herein when the instructions are executed.

In some embodiments, the memory 208 may be non-transitory and may include, for example, one or more volatile and/or non-volatile memories. In other words, for example, the memory 208 may be an electronic storage device (e.g., a computer readable storage medium). The memory 208 may be configured to store information, data, content, applications, instructions, or the like, for enabling the apparatus 200 to carry out various functions in accordance with example embodiments of the present disclosure. In this regard, the memory 208 may be preconfigured to include computer-coded instructions (e.g., computer program code), and/or dynamically be configured to store such computer-coded instructions for execution by the processor 204.

In an example embodiment, the apparatus 200 further includes communications circuitry 210 that may enable the apparatus 200 to receive path-integrated gas concentration data from one or more hyperspectral imaging devices 102 and/or to transmit the generated gas column density maps to other devices for further processing and/or display to users through a communication network. The communications circuitry 210 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 210 may include, for example, a network interface for enabling communications with a wired or wireless communication network. For example, the communications circuitry 210 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, to train an AI system to predict a gas leak rate based on gas column density maps, example embodiments described herein use gas column density maps that meet one or more predefined quality metrics. One quality metric that may be used to determine if a gas column density map is of sufficient quality to input to a learning portion of such an AI system is the number of discrete plumes showing in the gas column density map. A plume in a gas column density map is a visual representation of the actual gas cloud being imaged. As an example, a gas column density map may be of insufficient quality to input to an AI learning system if the gas column density map has a number of discrete plumes that exceeds a predefined threshold. For example, a gas column density map may be of insufficient quality to input to an AI learning system if the gas column density map has more than five discrete plumes. As another example, a gas column density map may be of insufficient quality to input to an AI learning system if the gas column density map has more than ten discrete plumes. The example gas column density map of FIG. 3 may be considered to be of sufficient quality to input to an AI learning system because there is only one discrete plume. In contrast, the example gas column density map of FIG. 4 may be considered to be of insufficient quality to input to an AI learning system because there are more than five discrete plumes (specifically, there are seven discrete plumes).

Another quality metric that may be used to determine if a gas column density map is of sufficient quality to input to an AI learning system is the size of the largest plume in the gas column density map, which may in some embodiments be expressed as a number of pixels in the gas column density map. As an example, a gas column density map may be of insufficient quality to input to an AI learning system if the size of the largest plume in the gas column density map is below a predefined threshold. Any suitable threshold may be used. In some embodiments the threshold could depend on the distance to the gas leak. For example, a column density map with a larger distance may have a smaller threshold for the gas plume size. In an example embodiment, the threshold may be set such that if the distance to the leak is 50 meters the largest plume should be at least 100 pixels and if the distance to the leak is 100 meters, the largest plume should be at least 80 pixels (in some embodiments, the threshold for different distances may be interpolated/extrapolated as needed). For example, a gas column density map may be of insufficient quality to input to an AI learning system if the percentage of pixels of the gas column density map in which a plume is visible is less than twenty-five percent. Any suitable threshold may be used. Another quality metric that may be used to determine if a gas column density map is of sufficient quality to input to an AI learning system is the distance between the gas plume(s) in the gas column density map and the leak location. Another quality metric that may be used to determine if a gas column density map is of sufficient quality to input to an AI learning system is if the gas column density map includes plume(s) that do not change over time (as viewed in multiple sequential images).

In some embodiments, example embodiments described herein filter out low quality (i.e., not meeting one or more quality metrics) gas column density maps only if the percentage of low quality gas column density maps exceeds a predefined percentage. If the percentage of low quality gas column density maps is sufficiently low, the low quality gas column density maps may not negatively affect the AI learning system. As an example, if the percentage of low quality gas column density maps is below one percent, filtering out the low quality gas column density maps may not be necessary. Any suitable percentage may be used.

Figure 5:
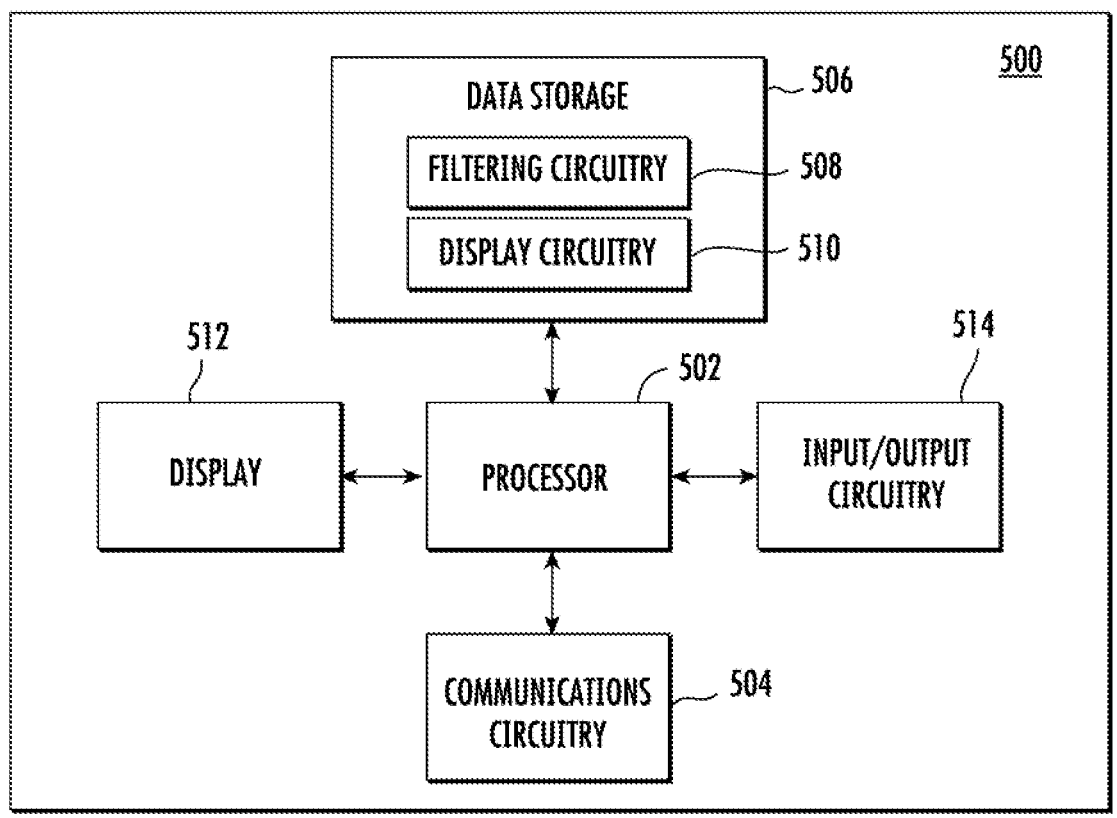
FIG. 5 illustrates an example block diagram of an example gas column density map filtering apparatus in accordance with example embodiments of the present disclosure.

Filtering out some or all of the low quality gas column density maps before inputting the gas column density maps into an AI learning system may be done manually, programmatically, or a combination of both. FIG. 5 illustrates an example block diagram of an example gas column density map filtering apparatus in accordance with example embodiments of the present disclosure. In some embodiments, the filtering apparatus 500 of FIG. 5 may receive gas column density maps (or any other suitable representation of path-integrated gas concentration data) from the central processing apparatus 200 of FIG. 2 or directly from one or more hyperspectral imaging devices 102 of FIG. 1 or from some other source. The filtering apparatus 500 may automatically filter out low quality gas column density maps and/or may enable one or more users to manually filter out low quality gas column density maps. In some embodiments, the filtering process may be alternatively performed within one or more hyperspectral imaging devices such as hyperspectral imaging device 102 or within a central processing apparatus such as central processing apparatus 200.

The filtering apparatus 500 may include a processor 502, data storage 506, communications circuitry 504, a display 512, and input/output circuitry 514. The apparatus 500 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

The use of the term "circuitry" as used herein with respect to components of the apparatus should therefore be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 500 may provide or supplement the functionality of particular circuitry. For example, the processor 502 may provide processing functionality, the communications circuitry 504 may provide network interface functionality, the data storage 506 may provide storage functionality, and the like.

In some embodiments, the processor 502 (and/or co-processor or any other processing circuitry assisting or otherwise associated with the processor) may be in communication with the data storage 506 via a bus for passing information among components of the apparatus. The processor 502 may be embodied in a number of different ways and may, for example, include one or more processing devices configured to perform independently. Additionally, or alternatively, the processor 502 may include one or more processors configured in tandem via a bus to enable independent execution of instructions, pipelining, and/or multi-threading. The use of the term "processing circuitry" may be understood to include a single core processor, a multi-core processor, multiple processors internal to the apparatus, and/or remote or "cloud" processors.

For example, the processor 502 may be embodied as one or more complex programmable logic devices (CPLDs), microprocessors, multi-core processors, co-processing entities, application-specific instruction-set processors (ASIPs), and/or controllers. Further, the processor 502 may be embodied as one or more other processing devices or circuitry. The term circuitry may refer to an entirely hardware embodiment or a combination of hardware and computer program products. Thus, the processor 502 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 502 may be configured for a particular use or configured to execute instructions stored in volatile or non-volatile media or otherwise accessible to the processor 502. As such, whether configured by hardware or computer program products, or by a combination thereof, the processor 502 may be capable of performing steps or operations according to embodiments of the present disclosure when configured accordingly.

In an example embodiment, the processor 502 may be configured to execute instructions stored in the data storage 506 or otherwise accessible to the processor. Alternatively, or additionally, the processor 502 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 502 is embodied as an executor of software instructions, the instructions may specifically configure the processor to perform the algorithms and/or operations described herein when the instructions are executed.

In one embodiment, the data storage 506 may further include or be in communication with volatile media (also referred to as volatile storage, memory, memory storage, memory circuitry and/or similar terms used herein interchangeably). In one embodiment, the volatile storage or memory may also include, such as but not limited to, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the data storage 506 may be used to store at least portions of the databases, database instances, database management system entities, data, applications, programs, program modules, scripts, source code, object code, byte code, compiled code, interpreted code, machine code, executable instructions, and/or the like being executed by, for example, the processor 502 as shown in FIG. 5. Thus, the databases, database instances, database management system entities, data, applications, programs, program modules, scripts, source code, object code, byte code, compiled code, interpreted code, machine code, executable instructions, and/or the like may be used to control certain aspects of the operation of the filtering apparatus 500 with the assistance of the processor 502 and operating system.

In one embodiment, the data storage 506 may further include or be in communication with non-volatile media (also referred to as non-volatile storage, memory, memory storage, memory circuitry and/or similar terms used herein interchangeably). In one embodiment, the data storage 506 may include, such as, but not limited to, hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the data storage 506 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In various embodiments of the present disclosure, the data storage 506 may also be embodied as a data storage device or devices, as a separate database server or servers, or as a combination of data storage devices and separate database servers. Further, in some embodiments, data storage 506 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, data storage 506 may encompass one or more data stores configured to store information/data usable in certain embodiments.

In the example as shown in FIG. 5, one or more instances of circuitry may be part of the data storage 506. In this example, the term "circuitry" refers to one or more data storage units in the data storage 506 that may store executable computer program instructions. When the executable computer program instructions stored in such circuitry are executed by a processing circuitry (such as, but not limited to, the processor 502 shown in FIG. 5), the executable computer program instructions may cause the processing circuitry to perform one or more functions. In the example shown in FIG. 5, the data storage 506 may comprise filtering circuitry 508 and display circuitry 510. In some embodiments, the filtering circuitry 508 may comprise executable computer program instructions that analyze gas column density maps and filter out the low quality gas column density maps, such as by determining if each gas column density map meets one or more of the quality metrics described above. In some embodiments, the display circuitry 510 may comprise executable computer program instructions that display one or more of the gas column density maps to a user to enable a user to make a determination if the gas column density map is of sufficient quality to be input to an AI learning system.

While the description above describes examples of the filtering circuitry and the display circuitry as software-based applications, it is noted that the scope of the present disclosure is not limited to the description above. In some examples, examples of filtering circuitry and the display circuitry may comprise hardware-based elements.

The communications circuitry 504 may be any means such as a device or circuitry embodied in either hardware or a combination of hardware and software that is configured to receive and/or transmit data from/to a network and/or any other device, circuitry, or module in communication with the filtering apparatus 500. In this regard, the communications circuitry 504 may include, for example, a network interface for enabling communications with a wired or wireless communication network and/or in accordance with a variety of networking protocols described herein. For example, the communications circuitry 504 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some embodiments, the apparatus 500 may include the display 512 that may, in turn, be in communication with the processor 502 to display one or more of the gas column density maps to a user. In various examples of the present disclosure, the display 512 may include a liquid crystal display (LCD), a light-emitting diode (LED) display, a plasma (PDP) display, a quantum dot (QLED) display, and/or the like.

In some embodiments, the apparatus 500 may include the input/output circuitry 514 that may, in turn, be in communication with the processor 502 to provide output to the user and, in some embodiments, to receive an indication of a user input (such as, for example, whether a gas column density map is of acceptable quality or not). The input/output circuitry 514 may comprise an interface, a mobile application, a kiosk, or the like. In some embodiments, the input/output circuitry 514 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the data storage 506, and/or the like).

It is also noted that all or some of the information discussed herein can be based on data that is received, generated and/or maintained by one or more components of filtering apparatus 500. In some embodiments, one or more external systems (such as a remote cloud computing and/or data storage system) may also be leveraged to provide at least some of the functionality discussed herein.

As described above, gas column density maps (in some embodiments, filtered to remove low quality maps, as described above), typically from one or more gas test leaks, along with an associated distance from a gas leak imaging device to the corresponding gas leak test and an associated leak rate of the corresponding gas leak test, may be input into a learning model of an AI system, such as a neural network, to create a gas leak rate predictive model. Once the learning model is created, gas column density maps (in some embodiments, filtered to remove low quality maps, as described above) from an actual gas leak, along with an associated distance from a gas leak imaging device to the gas leak, may be input into the gas leak rate predictive model to produce a predicted gas leak rate.

Figure 6:
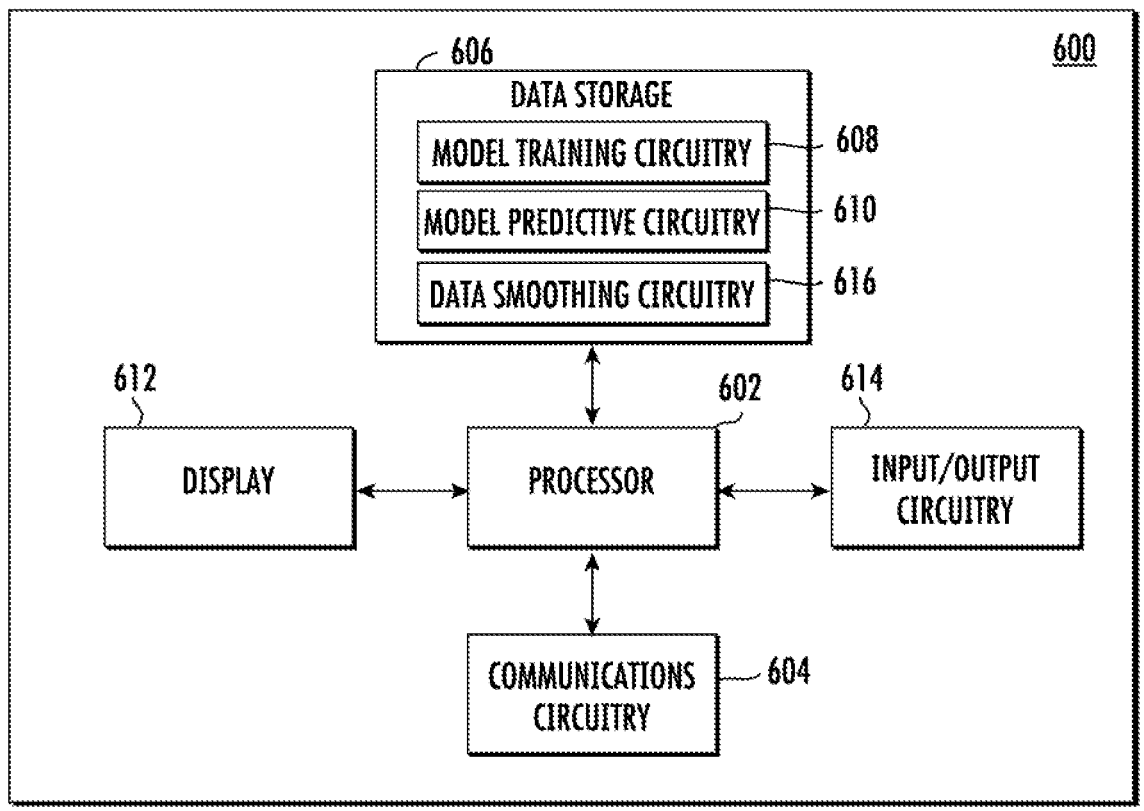
FIG. 6 illustrates an example block diagram of an example apparatus for predictive model training and execution in accordance with example embodiments of the present disclosure.

FIG. 6 illustrates an example block diagram of an example apparatus for creating and implementing such a gas leak rate predictive model, in accordance with example embodiments of the present disclosure. In some embodiments, the apparatus 600 of FIG. 6 may receive gas column density maps (or any other suitable representation of path-integrated gas concentration data) and corresponding distances from the filtering apparatus of FIG. 5, from the central processing apparatus 200 of FIG. 2, or directly from one or more hyperspectral imaging devices 102 of FIG. 1.

The apparatus 600 may include a processor 602, data storage 606, communications circuitry 604, a display 612, and input/output circuitry 614. The apparatus 600 is configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries.

In some embodiments, other elements of the apparatus 600 may provide or supplement the functionality of particular circuitry. For example, the processor 602 may provide processing functionality, the communications circuitry 604 may provide network interface functionality, the data storage 606 may provide storage functionality, and the like.

In some embodiments, the processor 602 (and/or co-processor or any other processing circuitry assisting or otherwise associated with the processor) may be in communication with the data storage 606 via a bus for passing information among components of the apparatus. The processor 602 may be embodied in a number of different ways and may, for example, include one or more processing devices configured to perform independently. Additionally, or alternatively, the processor 602 may include one or more processors configured in tandem via a bus to enable independent execution of instructions, pipelining, and/or multi-threading. The use of the term "processing circuitry" may be understood to include a single core processor, a multi-core processor, multiple processors internal to the apparatus, and/or remote or "cloud" processors.

For example, the processor 602 may be embodied as one or more complex programmable logic devices (CPLDs), microprocessors, multi-core processors, co-processing entities, application-specific instruction-set processors (ASIPs), and/or controllers. Further, the processor 602 may be embodied as one or more other processing devices or circuitry. The term circuitry may refer to an entirely hardware embodiment or a combination of hardware and computer program products. Thus, the processor 602 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 602 may be configured for a particular use or configured to execute instructions stored in volatile or non-volatile media or otherwise accessible to the processor 602. As such, whether configured by hardware or computer program products, or by a combination thereof, the processor 602 may be capable of performing steps or operations according to embodiments of the present disclosure when configured accordingly.

In an example embodiment, the processor 602 may be configured to execute instructions stored in the data storage 606 or otherwise accessible to the processor. Alternatively, or additionally, the processor 602 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 602 is embodied as an executor of software instructions, the instructions may specifically configure the processor to perform the algorithms and/or operations described herein when the instructions are executed.

In one embodiment, the data storage 606 may further include or be in communication with volatile media (also referred to as volatile storage, memory, memory storage, memory circuitry and/or similar terms used herein interchangeably). In one embodiment, the volatile storage or memory may also include, such as but not limited to, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the data storage 606 may be used to store at least portions of the databases, database instances, database management system entities, data, applications, programs, program modules, scripts, source code, object code, byte code, compiled code, interpreted code, machine code, executable instructions, and/or the like being executed by, for example, the processor 602 as shown in FIG. 6. Thus, the databases, database instances, database management system entities, data, applications, programs, program modules, scripts, source code, object code, byte code, compiled code, interpreted code, machine code, executable instructions, and/or the like may be used to control certain aspects of the operation of the apparatus 600 with the assistance of the processor 602 and operating system.

In one embodiment, the data storage 606 may further include or be in communication with non-volatile media (also referred to as non-volatile storage, memory, memory storage, memory circuitry and/or similar terms used herein interchangeably). In one embodiment, the data storage 606 may include, such as, but not limited to, hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the data storage 606 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to may refer to a structured or unstructured collection of information/data that is stored in a computer-readable storage medium.

In various embodiments of the present disclosure, the data storage 606 may also be embodied as a data storage device or devices, as a separate database server or servers, or as a combination of data storage devices and separate database servers. Further, in some embodiments, data storage 606 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third-party provider and where some or all of the information/data required for the operation of the recovery system may be stored. Further, the information/data required for the operation of the recovery system may also be partially stored in the cloud data storage system and partially stored in a locally maintained data storage system. More specifically, data storage 606 may encompass one or more data stores configured to store information/data usable in certain embodiments.

In the example as shown in FIG. 6, one or more instances of circuitry may be part of the data storage 606. In the example, the term "circuitry" refers to one or more data storage units in the data storage 606 that may store executable computer program instructions. When the executable computer program instructions stored in such circuitry are executed by a processing circuitry (such as, but not limited to, the processor 602 shown in FIG. 6), the executable computer program instructions may cause the processing circuitry to perform one or more functions. In the example shown in FIG. 6, the data storage 606 may comprise a predictive model training or learning circuitry 608, a predictive model predictive or execution circuitry 610, and a data smoothing circuitry 616. In some embodiments, the predictive model training or learning circuitry 608 may comprise executable computer program instructions that input the gas column density maps from one or more gas test leaks, along with an associated distance from a gas leak imaging device to the corresponding gas leak test and an associated leak rate of the corresponding gas leak test, into a learning model of an AI system, such as a neural network, to create a gas leak rate predictive model. In some embodiments, the predictive or execution circuitry 610 may comprise executable computer program instructions that input gas column density maps from an actual gas leak, along with an associated distance from a gas leak imaging device to the gas leak, into the gas leak rate predictive model of an AI system, such as a neural network, to produce a predicted gas leak rate. In some embodiments, the data smoothing circuitry 616 may comprise executable computer program instructions that applies data smoothing algorithms (such as a machine learning smoothing algorithm) to the predicted gas leak rates to provide a more stable estimate. Such data smoothing algorithms may include moving average, exponentially weighted moving average, or any other suitable data smoothing algorithm. While the description above describes examples of the training circuitry, the predictive circuitry, and the data smoothing circuitry as software-based applications, it is noted that the scope of the present disclosure is not limited to the description above. In some examples, examples of training circuitry, the predictive circuitry, and the data smoothing circuitry may comprise hardware-based elements.

In some embodiments, the gas column density maps from one or more gas leak tests may each have an associated leak location expressed as one or more pixels of the corresponding gas column density map. FIG. 3 illustrates the leak location in the image as an 'X' as the base of the plume. In some embodiments, the predictive model training or learning circuitry 608 may further comprise executable computer program instructions that input the gas column density maps from one or more gas test leaks, along with an associated distance from a gas leak imaging device to the corresponding gas leak test and an associated leak location within the corresponding gas column density map (the leak location, expressed as one or more pixels of the corresponding gas column density map, may be identified manually within each gas column density map, hyperspectral image, or visual RGB image), into a learning model of an AI system, such as a neural network, to create a gas leak location predictive model.

The communications circuitry 604 may be any means such as a device or circuitry embodied in either hardware or a combination of hardware and software that is configured to receive and/or transmit data from/to a network and/or any other device, circuitry, or module in communication with the apparatus 600. In this regard, the communications circuitry 604 may include, for example, a network interface for enabling communications with a wired or wireless communication network and/or in accordance with a variety of networking protocols described herein. For example, the communications circuitry 604 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some embodiments, the apparatus 600 may include the display 612 that may, in turn, be in communication with the processor 602 to display a predicted gas leak rate from the gas leak rate predictive model to a user or users. In various examples of the present disclosure, the display 612 may include a liquid crystal display (LCD), a light-emitting diode (LED) display, a plasma (PDP) display, a quantum dot (QLED) display, and/or the like.

In some embodiments, the apparatus 600 may include the input/output circuitry 614 that may, in turn, be in communication with the processor 602 to provide output to the user and, in some embodiments, to receive an indication of a user input. The input/output circuitry 614 may comprise an interface, a mobile application, a kiosk, or the like. In some embodiments, the input/output circuitry 614 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the data storage 606, and/or the like).

It is also noted that all or some of the information discussed herein can be based on data that is received, generated and/or maintained by one or more components of apparatus 600. In some embodiments, one or more external systems (such as a remote cloud computing and/or data storage system) may also be leveraged to provide at least some of the functionality discussed herein.

Figure 7:
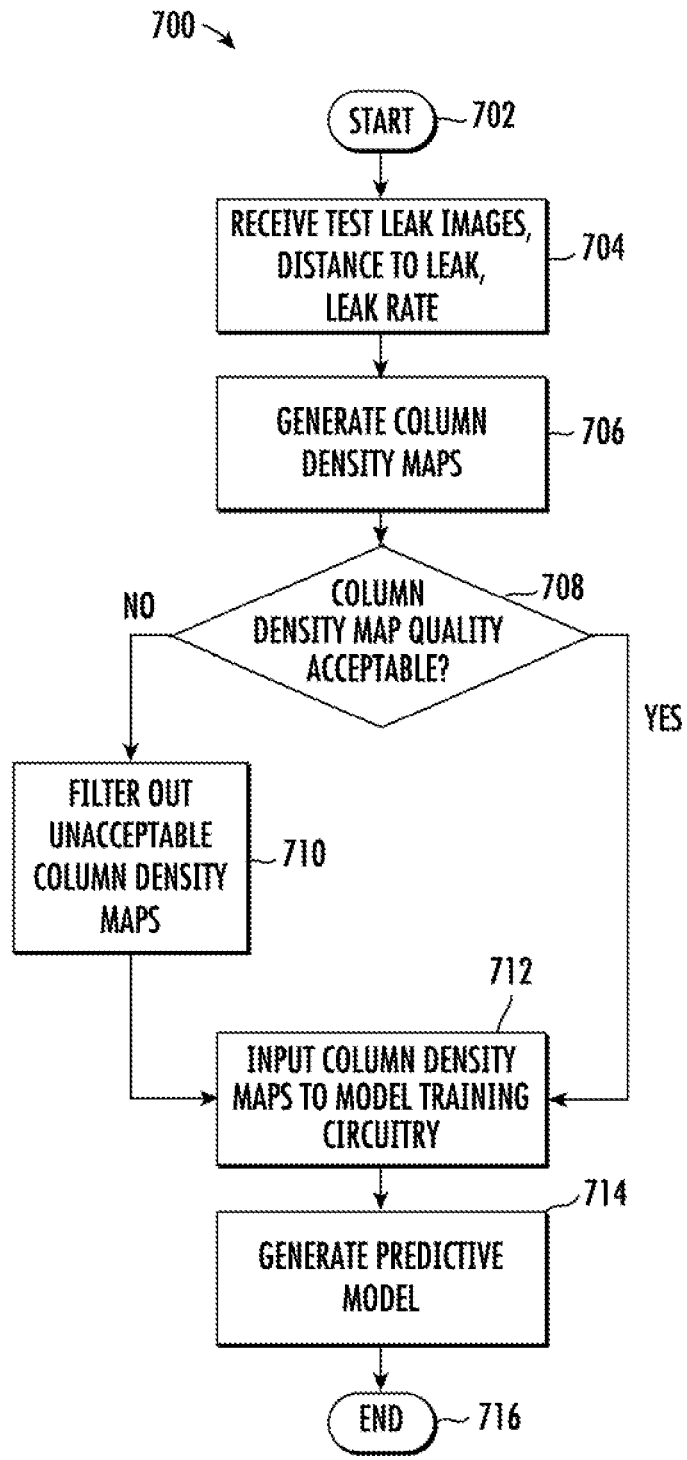
FIG. 7 is an example flowchart illustrating an example method of training a fugitive gas quantification predictive model in accordance with example embodiments of the present disclosure.
Figure 8:
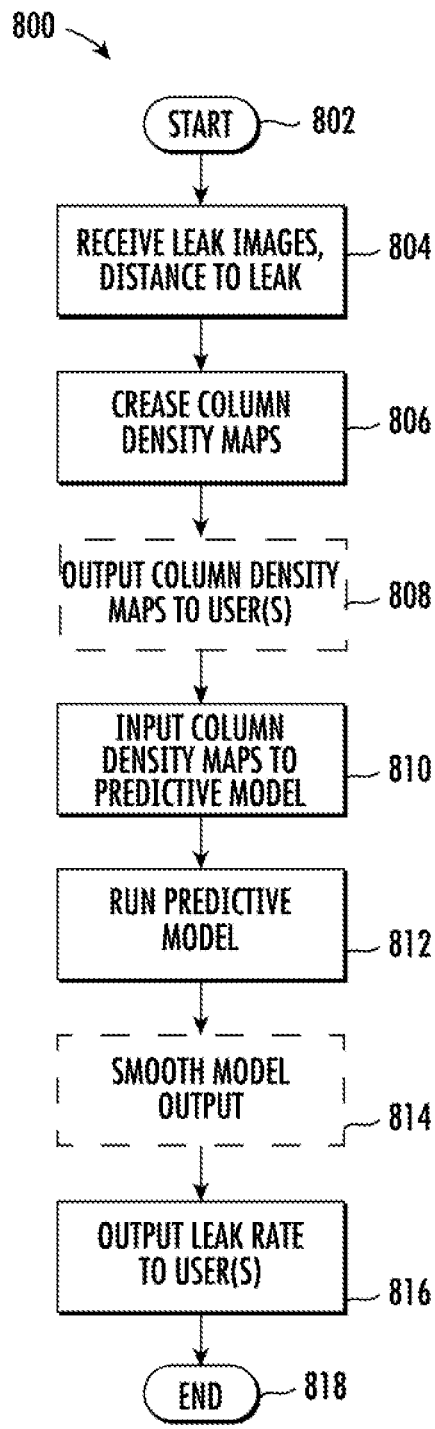
FIG. 8 is an example flowchart illustrating an example method of executing a fugitive gas quantification predictive model in accordance with example embodiments of the present disclosure.

Reference will now be made to FIG. 7 and FIG. 8, which provide flowcharts illustrating example steps, processes, procedures, and/or operations in accordance with various embodiments of the present disclosure.

Various methods described herein, including, for example, example methods as shown in FIG. 7 and FIG. 8, may provide various technical benefits and improvements. It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIG. 7 and FIG. 8 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 7, an example method 700 is illustrated. In some embodiments, the example method 700 may generate a fugitive gas quantification predictive model (which may also be termed a gas leak rate predictive model) to enable gas leak rate prediction based on path-integrated gas concentration data such as gas column density maps. In some embodiments, the example method 700 may be used while development activity related to a hyperspectral imaging system is on-going to continue to improve the capability of such a hyperspectral imaging system to accurately translate path-integrated gas concentration data into gas leak rate data.

The example method 700 starts at step/operation 702. At step/operation 704, a processor (such as, but not limited to, the processor 204 of the central processing apparatus 200 described above in connection with FIG. 2) receives hyperspectral images of a test gas leak from one or more hyperspectral imaging devices, along with a corresponding distance between the respective hyperspectral imaging device and the test gas leak and the leak rate of the test gas leak. In some embodiments, the processor may receive the hyperspectral images of the test gas leak, the corresponding distance between the respective hyperspectral imaging device and the test gas leak, and the leak rate of the test gas leak from two or more different sources. The hyperspectral images may come directly or indirectly from one or more hyperspectral imaging devices, while the corresponding distance between the respective hyperspectral imaging device and the test gas leak and the leak rate of the test gas leak may be linked (manually in some cases) to the respective hyperspectral image(s) in a separate process.

In the example shown in FIG. 7, at step/operation 706, a processor (such as, but not limited to, the processor 204 of the central processing apparatus 200 described above in connection with FIG. 2) generates gas column density maps from the hyperspectral images of the test gas leak. As with the hyperspectral images, the gas column density maps should be linked to the corresponding distance between the respective hyperspectral imaging device and the test gas leak and the leak rate of the test gas leak in order to train the AI based gas leak rate predictive model.

In some embodiments, the gas column density maps may alternatively be generated by the respective hyperspectral imaging device. In some embodiments, the path-integrated gas concentration data of the test gas leak may alternatively be represented by something other than gas column density maps, and that alternative representation may be used to train the AI based gas leak rate predictive model.

In the example shown in FIG. 7, at step/operation 708, a processor (such as, but not limited to, the processor 502 of the filtering apparatus 500 described above in connection with FIG. 5) determines if the quality of the gas column density maps is acceptable to train the AI based gas leak rate predictive model. As described above, determining if the quality of the gas column density maps is acceptable to train the AI based gas leak rate predictive model may be accomplished by comparing the gas column density maps to one or more quality metrics. Such quality metrics may include whether the number of discrete plumes in a gas column density map exceeds a predefined threshold. In some embodiments, determining if the quality of the gas column density maps is acceptable to train the AI based gas leak rate predictive model may be done manually, programmatically (such as, but not limited to, by the processor 502 of the filtering apparatus 500 described above in connection with FIG. 5), or a combination of both.

In the example shown in FIG. 7, subsequent to and/or in response to determining at step/operation 708 that the quality of the gas column density maps is not acceptable to train the AI based gas leak rate predictive model, at step/operation 710, a processor (such as, but not limited to, the processor 502 of the filtering apparatus 500 described above in connection with FIG. 5) filters out the gas column density maps where the quality of the gas column density maps is not acceptable to train the AI based gas leak rate predictive model.

In some embodiments, filtering out any gas column density maps where the quality of the gas column density maps is not acceptable to train the AI based gas leak rate predictive model may be done manually, programmatically (such as, but not limited to, by the processor 502 of the filtering apparatus 500 described above in connection with FIG. 5), or a combination of both.

In the example shown in FIG. 7, at step/operation 712, a processor (such as, but not limited to, the processor 602 of the apparatus 600 described above in connection with FIG. 6) inputs the gas column density maps along with the corresponding distance between the respective hyperspectral imaging device and the test gas leak and the leak rate of the test gas leak for each gas column density map into an AI based predictive model training or learning system to generate an AI based gas leak rate predictive model that is capable of predicting the gas leak rate when presented with gas column density maps (or some other suitable representation of path-integrated gas concentration data) from an actual gas leak, along with the corresponding distance(s) between the respective hyperspectral imaging device(s) and the actual gas leak.

To train the AI based gas leak rate predictive model, a sufficiently high number (typically tens of thousands or hundreds of thousands) of gas column density maps, corresponding distances, and corresponding leak rates should be input into the AI based predictive model training or learning system.

In the example shown in FIG. 7, at step/operation 714, a processor (such as, but not limited to, the processor 602 of the apparatus 600 described above in connection with FIG. 6) generates an AI based gas leak rate predictive model that is capable of predicting the gas leak rate when presented with gas column density maps (or some other suitable representation of path-integrated gas concentration data) from an actual gas leak, along with the corresponding distance(s) between the respective hyperspectral imaging device(s) and the actual gas leak.

Various embodiments of the present disclosures may implement artificial intelligence and/or machine learning algorithms for gas leak rate prediction that include, but are not limited to, Linear Regression algorithm, Logistic Regression algorithm, Decision Tree algorithm, support vector machine (SVM) algorithm, Naive Bayes algorithm, k-nearest neighbors (KNN) algorithm, K-Means algorithm, Random Forest algorithm, recurrent neural network (RNN) algorithm, generative adversarial network (GAN) algorithm, artificial neural network, and/or the like, to generate the predictive indicia data editing model.

The example method 700 ends at step/operation 716. In some embodiments, the example method 700 may execute iteratively until a sufficiently high number of gas column density maps, corresponding distances, and corresponding leak rates have been input into the AI based predictive model training or learning system to train the AI based gas leak rate predictive model.

Referring now to FIG. 8, an example method 800 of executing a fugitive gas quantification predictive model is illustrated. In some embodiments, the example method 800 may utilize an AI based gas leak rate predictive model such as is generated in example method 700.

The example method 800 starts at step/operation 802. At step/operation 804, a processor (such as, but not limited to, the processor 204 of the central processing apparatus 200 described above in connection with FIG. 2) receives hyperspectral images of an actual (i.e., non-test) gas leak from one or more hyperspectral imaging devices, along with a corresponding distance between the respective hyperspectral imaging device and the gas leak. In some embodiments, the processor may receive the hyperspectral images of the gas leak and the corresponding distance between the respective hyperspectral imaging device and the gas leak from, directly or indirectly, one or more hyperspectral imaging devices.

In the example shown in FIG. 8, at step/operation 806, a processor (such as, but not limited to, the processor 204 of the central processing apparatus 200 described above in connection with FIG. 2) generates gas column density maps from the hyperspectral images of the gas leak. As with the hyperspectral images, the gas column density maps should each be linked to a corresponding distance between the respective hyperspectral imaging device and the gas leak.

In some embodiments, the gas column density maps alternatively may be generated by the respective hyperspectral imaging device. In some embodiments, the path-integrated gas concentration data of the test gas leak may alternatively be represented by something other than gas column density maps, and that alternative representation may be used to train the AI based gas leak rate predictive model.

In the example shown in FIG. 8, at step/operation 808, a processor (such as, but not limited to, the processor 602 of the apparatus 600 described above in connection with FIG. 6) optionally outputs one or more of the gas column density maps to a display (such as, but not limited to, the display 612 of the apparatus 600 described above in connection with FIG. 6) for a user or users to view. In some embodiments, if the gas column density maps are generated by a different process and/or a different apparatus, the gas column density maps may alternatively or additionally be displayed by a different process and/or a different apparatus.

In the example shown in FIG. 8, at step/operation 810, a processor (such as, but not limited to, the processor 602 of the apparatus 600 described above in connection with FIG. 6) inputs the gas column density maps, along with associated distances, to a gas leak rate predictive model (such as, but not limited to, the predictive circuitry 610 of the apparatus 600 described above in connection with FIG. 6).

In some embodiments, the gas column density maps may be generated by the respective hyperspectral imaging device and then input into the gas leak predictive model as described in example method 800. In some embodiments, the path-integrated gas concentration data of the test gas leak may be represented by something other than gas column density maps, and that alternative representation may be used in example method 800.

In the example shown in FIG. 8, at step/operation 812, a processor (such as, but not limited to, the processor 602 of the apparatus 600 described above in connection with FIG. 6) executes a gas leak rate predictive model (such as, but not limited to, the predictive circuitry 610 of the apparatus 600 described above in connection with FIG. 6).

The output of a gas leak rate predictive model is a predicted gas leak rate, typically specified in kilograms per hour or the like. As gas column density maps continue to be input into the gas leak rate predictive model, the predicted gas leak rate will typically change in response to the differences in the gas column density maps (due to natural variations in the gas plume, low quality gas column density maps (even if only a small number), etc.). Thus, in some embodiments it may be desirable to apply data smoothing algorithms to the predicted gas leak rates to provide a more stable estimate.

In the example shown in FIG. 8, at step/operation 814, a processor (such as, but not limited to, the processor 602 of the apparatus 600 described above in connection with FIG. 6) applies a smoothing algorithm (such as, but not limited to, the smoothing circuitry 616 of the apparatus 600 described above in connection with FIG. 6) to the predicted gas leak rates from the gas leak rate predictive model.

In the example shown in FIG. 8, at step/operation 816, a processor (such as, but not limited to, the processor 602 of the apparatus 600 described above in connection with FIG. 6) outputs the predicted gas leak rate to a display (such as, but not limited to, the display 612 of the apparatus 600 described above in connection with FIG. 6) for a user or users to view. In some embodiments, the predicted gas leak rate that is displayed at step/operation 816 is a smoothed value of the predicted gas leak rate if step/operation 814 is optionally performed.

The example method 800 ends at step/operation 818. In some embodiments, the example method 800 may execute iteratively, the gas leak continues to be monitored with a hyperspectral imaging system, and it is desired to predict the leak rate of the gas leak using the AI based gas leak rate predictive model.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus comprising at least one processor and at least one non-transitory memory comprising program code, wherein the at least one non-transitory memory and the program code are configured to, with the at least one processor, cause the apparatus to at least:
    obtain a plurality of gas column density maps associated with one or more gas leak tests, each gas column density map having an associated distance from a gas leak imaging device to a corresponding one of the one or more gas leak tests and an associated leak rate of a corresponding one of the one or more gas leak tests;
    determine if the plurality of gas column density maps meet a predefined quality threshold;
    if the plurality of gas column density maps does not meet the predefined quality threshold, filter the plurality of gas column density maps to remove any gas column density maps that do not meet one or more predefined quality metrics and generate a leak rate predictive model based at least in part on providing some or all of any remaining gas column density maps that do meet the one or more predefined quality metrics, associated distances from the gas leak imaging device to the corresponding one of the one or more gas leak tests, and associated leak rates of the corresponding one of the one or more gas leak tests to an artificial intelligence algorithm; and
    if the plurality of gas column density maps does meet the predefined quality threshold, generate a leak rate predictive model based at least in part on providing some or all of the gas column density maps, associated distances from the gas leak imaging device to the corresponding one of the one or more gas leak tests, and associated leak rates of the corresponding one of the one or more gas leak tests to the artificial intelligence algorithm.

2. The apparatus of claim 1, wherein each gas column density map comprises one or more discrete plumes;
    wherein at least one of the predefined quality metrics comprises a number of discrete plumes in a gas column density map being less than a predefined plume threshold; and
    wherein the at least one non-transitory memory and the program code are configured to, with the at least one processor, cause the apparatus to:
    determine a number of discrete plumes for each gas column density map; and
    remove each gas column density map in which the number of discrete plumes is greater than the predefined plume threshold.

3. The apparatus of claim 1, wherein, if the plurality of gas column density maps meets the predefined quality threshold, the at least one non-transitory memory and the program code are configured to, with the at least one processor, cause the apparatus to:
    obtain a plurality of gas column density maps from a non-test gas leak, each gas column density map having an associated distance from a gas leak imaging device to the non-test gas leak; and
    provide the plurality of gas column density maps from the non-test gas leak and the corresponding distances from the gas leak imaging device to the non-test gas leak to the leak rate predictive model to generate a predicted leak rate for each of the plurality of gas column density maps from the non-test gas leak.

4. The apparatus of claim 3, wherein the at least one non-transitory memory and the program code are configured to, with the at least one processor, cause the apparatus to apply a smoothing algorithm to some or all of the generated predicted leak rates for the plurality of gas column density maps from the non-test gas leak.

5. The apparatus of claim 1, wherein the plurality of gas column density maps from one or more gas leak tests each have an associated leak location expressed as one or more pixels of the corresponding gas column density map; and
    wherein the at least one non-transitory memory and the program code are configured to, with the at least one processor, cause the apparatus to generate a leak location predictive model based at least in part on providing any remaining gas column density maps and associated leak locations to an artificial intelligence algorithm.

6. A computer-implemented method comprising:
    obtaining a plurality of gas column density maps associated with one or more gas leak tests, each gas column density map having an associated distance from a gas leak imaging device to a corresponding one of the one or more gas leak tests and an associated leak rate of a corresponding one of the one or more gas leak tests;
    determining if the plurality of gas column density maps meet a predefined quality threshold;
    if the plurality of gas column density maps does not meet the predefined quality threshold, filtering the plurality of gas column density maps to remove any gas column density maps that do not meet one or more predefined quality metrics and generating a leak rate predictive model based at least in part on providing some or all of any remaining gas column density maps that do meet the one or more predefined quality metrics, associated distances from the gas leak imaging device to the corresponding one of the one or more gas leak tests, and associated leak rates of the corresponding one of the one or more gas leak tests to an artificial intelligence algorithm; and if the plurality of gas column density maps does meet the predefined quality threshold, generating a leak rate predictive model based at least in part on providing some or all of the gas column density maps, associated distances from the gas leak imaging device to the corresponding one of the one or more gas leak tests, and associated leak rates of the corresponding one of the one or more gas leak tests to the artificial intelligence algorithm.

7. The computer-implemented method of claim 6, wherein each gas column density map comprises one or more discrete plumes:

wherein at least one of the predefined quality metrics comprises a number of discrete plumes in a gas column density map being less than a predefined plume threshold; and wherein the computer-implemented method further comprises:
determining a number of discrete plumes for each gas column density map; and
removing each gas column density map in which the number of discrete plumes is greater than the predefined plume threshold.

8. The computer-implemented method of claim 6, wherein, if the plurality of gas column density maps meets the predefined quality threshold, the computer-implemented method further comprises:

obtaining a plurality of gas column density maps from a non-test gas leak, each gas column density map having an associated distance from a gas leak imaging device to the non-test gas leak; and providing the plurality of gas column density maps from the non-test gas leak and the corresponding distances from the gas leak imaging device to the non-test gas leak to the leak rate predictive model to generate a predicted leak rate for each of the plurality of gas column density maps from the non-test gas leak.

9. The computer-implemented method of claim 8, wherein the computer-implemented method further comprises applying a smoothing algorithm to some or all of the generated predicted leak rates for the plurality of gas column density maps from the non-test gas leak.

10. The computer-implemented method of claim 6, wherein the plurality of gas column density maps from one or more gas leak tests each have an associated leak location expressed as one or more pixels of the corresponding gas column density map; and wherein the computer-implemented method further comprises generating a leak location predictive model based at least in part on providing any remaining gas column density maps and associated leak locations to an artificial intelligence algorithm.

11. A computer program product comprising at least one non-transitory computer-readable storage medium having computer-readable program code portions stored therein, the computer-readable program code portions comprising an executable portion configured to:

obtain a plurality of gas column density maps associated with one or more gas leak tests, each gas column density map having an associated distance from a gas leak imaging device to a corresponding one of the one or more gas leak tests and an associated leak rate of a corresponding one of the one or more gas leak tests;

determine if the plurality of gas column density maps meet a predefined quality threshold;

if the plurality of gas column density maps does not meet the predefined quality threshold, filter the plurality of gas column density maps to remove any gas column density maps that do not meet one or more predefined quality metrics and generate a leak rate predictive model based at least in part on providing some or all of any remaining gas column density maps that do meet the one or more predefined quality metrics, associated distances from the gas leak imaging device to the corresponding one of the one or more gas leak tests, and associated leak rates of the corresponding one of the one or more gas leak tests to an artificial intelligence algorithm; and if the plurality of gas column density maps does meet the predefined quality threshold, generate a leak rate predictive model based at least in part on providing some or all of the gas column density maps, associated distances from the gas leak imaging device to the corresponding one of the one or more gas leak tests, and associated leak rates of the corresponding one of the one or more gas leak tests to the artificial intelligence algorithm.

12. The computer program product of claim 11, wherein each gas column density map comprises one or more discrete plumes;

wherein at least one of the predefined quality metrics comprises a number of discrete plumes in a gas column density map being less than a predefined plume threshold; and wherein the computer-readable program code portions comprise the executable portion configured to:
determine a number of discrete plumes for each gas column density map; and
remove each gas column density map in which the number of discrete plumes is greater than the predefined plume threshold.

13. The computer program product of claim 11, wherein, if the plurality of gas column density maps meets the predefined quality threshold, the computer-readable program code portions comprise the executable portion configured to:

obtain a plurality of gas column density maps from a non-test gas leak, each gas column density map having an associated distance from a gas leak imaging device to the non-test gas leak; and provide the plurality of gas column density maps from the non-test gas leak and the corresponding distances from the gas leak imaging device to the non-test gas leak to the leak rate predictive model to generate a predicted leak rate for each of the plurality of gas column density maps from the non-test gas leak.

14. The computer program product of claim 13, wherein the computer-readable program code portions comprise the executable portion configured to apply a smoothing algorithm to some or all of the generated predicted leak rates for the plurality of gas column density maps from the non-test gas leak.

15. The computer program product of claim 11, wherein the plurality of gas column density maps from one or more gas leak tests each have an associated leak location expressed as one or more pixels of the corresponding gas column density map; and wherein the computer-readable program code portions comprise the executable portion configured to generate a leak location predictive model based at least in part on providing any remaining gas column density maps and associated leak locations to an artificial intelligence algorithm.

\* \* \* \* \*